No. 748,997. Patented January 5, 1904.

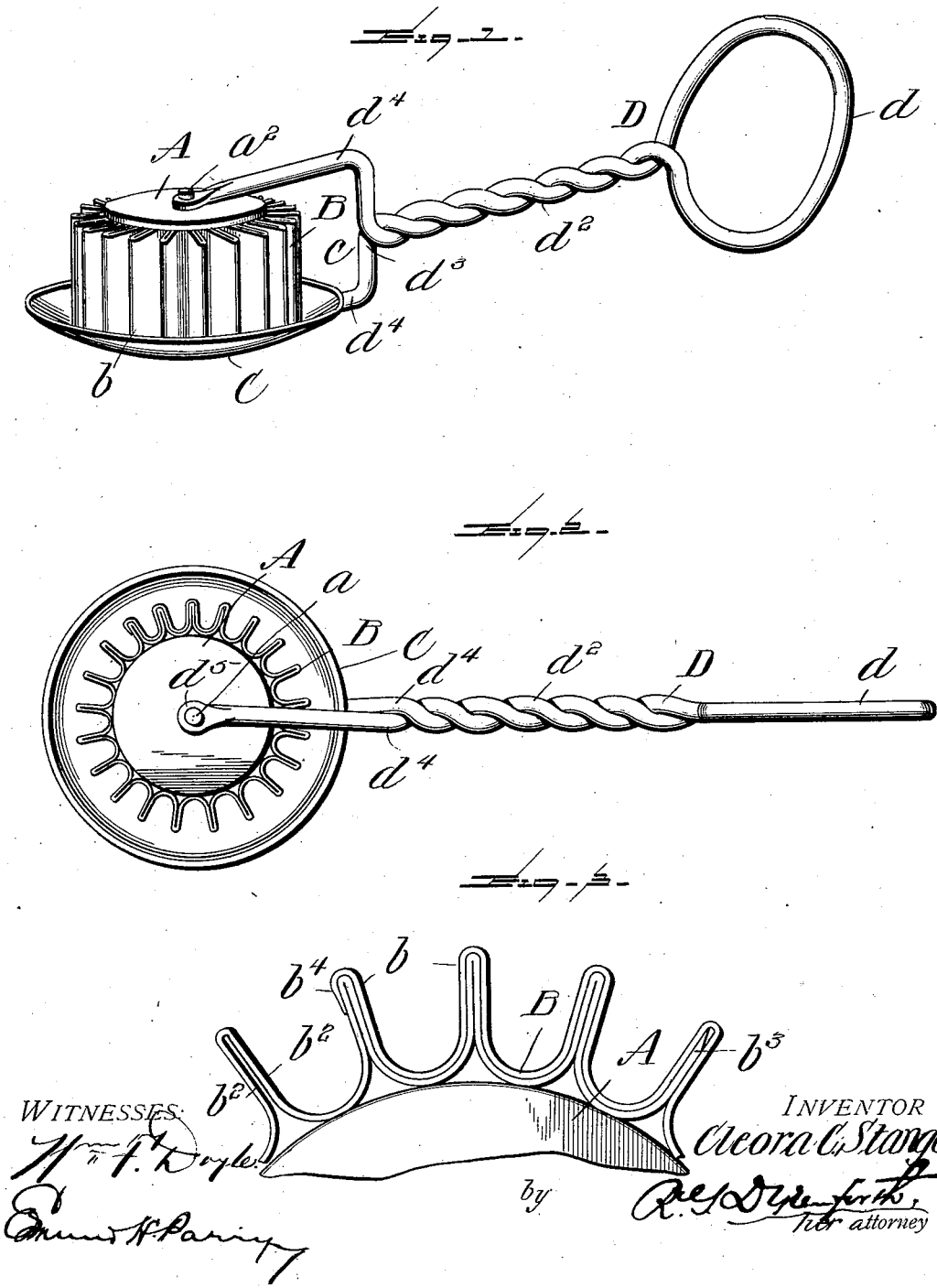

UNITED STATES PATENT OFFICE.

CLEORA C. STANGE, OF YATES CENTER, KANSAS.

MARKING AND CUTTING DEVICE.

SPECIFICATION forming part of Letters Patent No. 748,997, dated January 5, 1904.

Application filed October 9, 1902. Serial No. 126,520. (No model.)

*To all whom it may concern:*

Be it known that I, CLEORA C. STANGE, a citizen of the United States, residing at Yates Center, in the county of Woodson and State of Kansas, have invented certain new and useful Improvements in Marking and Cutting Devices; and I do hereby declare the following to be a full, clear, and exact description of the invention, such as will enable others skilled in the art to which it appertains to make and use the same.

The object is in a simple, convenient, and expedient manner to produce a marker device for use particularly in the making of pastry and other like matters; furthermore, to produce in a single structure a combined cutting and crimping device wherein the parts shall be so constructed and arranged as to effect the desired result.

With these objects in view the invention resides in various novel details of construction and combination of parts, as hereinafter more fully described and claimed.

In the accompanying drawings, forming part of this specification, and wherein like letters of reference indicate corresponding parts, I have illustrated an embodiment of my invention, though it is to be understood that other embodiments thereof may be employed and the same may be variously constituted and arranged and yet be characterized by my invention, the scope of which is not to be confined or restricted to any particular or peculiar structure—that is to say:

Figure 1 is a view in perspective illustrative of the preferred form of my invention. Fig. 2 is a view in plan thereof; and Fig. 3 is a detail view, enlarged, more clearly to show the construction of the crimper.

In the drawings, A designates a wheel or boss preferably provided with a central perforation $a$. This boss may be constructed of any appropriate material and size, and the perforation $a$ may be of any preferred dimension and form. Through the perforation $a$ I prefer to dispose a suitable shaft or axle $a^2$.

Suitably disposed upon the periphery of the boss A and preferably of width slightly less than the same is an annulus or annular member B, provided with projections $b$ of form and construction hereinafter more fully described.

At one side of the boss or wheel A and preferably connected therewith is a disk C of diameter greater than that of the boss to present a flange $c$, which subserves the dual function of a cutter or trimmer and guide. The periphery of this disk may, if desired, be provided with an edge to make the device more effective as a cutter. I prefer to depress the disk centrally to give it a convex form, and in this depressed portion the boss A is designed to be disposed so that the cutting edge of the disk overhangs the inner edge of the crimper, as is illustrated. I may secure the trimmer-disk to the boss A or not, as may be expedient. Centrally the disk may be perforated to receive the shaft $a$, which extends through the boss A.

A handle D may be provided to operate the parts already described, and any preferred form and arrangement of handle may be utilized for the purpose; but I prefer to employ that illustrated in the drawings, which preferably consists of a single piece of material having a grip $d$ provided at one end, a shank $d^2$, and a yoke or fork $d^3$ at the opposite end. The ends of the members $d^4 d^4$ of the yoke are preferably perforated, as at $d^5 d^5$, to receive the ends of the shaft $a$, and thus constitute bearing-bases for the same. I may, if expedient, provide the yoke members $d^4 d^4$ with pintles to take into indents in the boss to constitute another form of bearing. The handle D is preferably arranged at an angle to the axis of the boss or wheel. I prefer to dispose it at right angles thereto, for the reason that greater facility of action and convenience is thus afforded and more accurate work can thus be performed.

I do not, of course, desire to be confined to the form and arrangement of parts herein illustrated, as the same may be varied, as is obvious; but I lay particular stress upon the disposition of the handle at right angles to the axis of the crimper and cutter and also upon the particular formation and arrangement of the crimping or marking device, which I will now describe. This consists of a strip or band of material forming an annular member B of width the same or somewhat less than that of the boss or wheel and of length sufficient to encompass the same after being formed up. This strip or band forming an annular member B is formed up by being first placed in a corrugating or fluting machine. Then the elevations $b$ thus formed are pressed together to bring their two inner abutting walls $b^2$ $b^2$ closely in contact one with the other to effect a rigid and flat-surfaced projection. Thereupon the two ends $b^3$ $b^4$ of the strip are brought past each other and placed so that one of them will preferably be positioned between the abutting walls $b^2$ $b^2$ and the other lie, preferably, upon the exterior surface of the projections, as shown, and they being pressed hard upon the ends effect an interlocking of the ends in the flutes or corrugations. The walls are thus approximately parallel one with the other, though the projections would be radially positioned one with another. There is an important result accruing from forming the crimping projections in the manner described in that they are of a length and contour to penetrate the dough of the upper and lower crusts of a pie, say, and firmly bind these together.

My invention is strongly distinguished from those devices wherein are employed a handle disposed in the same plane as the axis of the annular member constituting the crimper, since in such a construction certainty and perfection of operation in cutting and crimping the pie-crusts are never possible, in that the hand manipulating the device cannot be held always in the proper relative position to insure the positioning of the crimper. Furthermore, my invention is differentiated from the art in the construction of the annular member or crimper. In the forms of device now being marketed the crimping-surface is usually merely a design embossed upon a roller, and the marking-surface is only of such thickness as to effect a marking without penetrating to the lower crust to produce a union thereof with the upper crust, a result highly important and advantageous.

It is obvious that my device may find use in situations other than as a pie crimper and cutter, since it may be employed as a marker device whenever such may be required.

Having thus fully described my invention, what I claim as new, and desire to secure by Letters Patent of the United States, is—

1. As an article of manufacture, a cutting and crimping device comprising a rotary wheel having its periphery provided with an annulus fluted and having an end positioned within the flutes, a trimmer, and a handle connecting with the wheel, substantially as described.

2. As an article of manufacture, a cutting and crimping device, comprising a rotary wheel having its periphery provided with an annulus having its surface corrugated and then formed up into projections having flat walls, one approximately parallel with the other, a trimmer disposed therewith, and a handle supporting the wheel and trimmer, substantially as described.

3. As an article of manufacture, a cutting and crimping device, comprising a rotary wheel having its periphery provided with an annulus having its surface corrugated and then formed up into projections having flat walls, one approximately parallel with the other and having an end positioned between walls of the corrugations, a trimmer disposed therewith, and a handle supporting the wheel and trimmer, substantially as described.

4. As a new article of manufacture, a marking device comprising a rotary wheel having disposed on its periphery an annulus corrugated, the walls formed by the corrugations being flat and one approximately parallel with the other, and a handle connecting therewith, substantially as described.

5. As a new article of manufacture, a marking device comprising a rotary wheel having disposed on its periphery an annulus formed of a strip of material corrugated to form interiorly-abutting walls approximately parallel one with the other and having an end of the strip positioned between the abutting walls, substantially as described.

In testimony whereof I affix my signature in the presence of two subscribing witnesses.

CLEORA C. STANGE.

Witnesses:
  WINTER S. RAINBOW,
  ALDINE A. ROBISON.